United States Patent
Kuwahara et al.

(10) Patent No.: US 9,561,793 B2
(45) Date of Patent: Feb. 7, 2017

(54) DRIVING APPARATUS FOR HYBRID VEHICLE AND CONTROL METHOD THEREOF

(71) Applicant: TOYOTA JIDOSHA KABUSHIKI KAISHA, Toyota-shi, Aichi-ken (JP)

(72) Inventors: Seiji Kuwahara, Toyota (JP); Yukihiko Ideshio, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/712,085

(22) Filed: May 14, 2015

(65) Prior Publication Data

US 2015/0336571 A1    Nov. 26, 2015

(30) Foreign Application Priority Data

May 21, 2014    (JP) ................. 2014-105348

(51) Int. Cl.
*B60L 9/00*    (2006.01)
*B60L 11/00*   (2006.01)
(Continued)

(52) U.S. Cl.
CPC ............. *B60W 20/40* (2013.01); *B60K 6/387* (2013.01); *B60K 6/46* (2013.01); *B60K 6/48* (2013.01); *B60K 6/547* (2013.01); *B60W 10/02* (2013.01); *B60W 10/06* (2013.01); *B60W 10/08* (2013.01); *B60W 10/10* (2013.01); *B60W 10/115* (2013.01); *B60W 10/30* (2013.01); *B60W 20/10* (2013.01); *B60W 20/30* (2013.01); *B60W 30/18054* (2013.01); *B60K 2006/4825* (2013.01); *B60W 2510/0208* (2013.01); *B60W 2510/06* (2013.01); *B60W 2510/101* (2013.01);
(Continued)

(58) Field of Classification Search
CPC ...... B60W 20/40; B60W 10/02; B60W 10/06; B60W 10/08; B60W 10/10; B60W 10/115; B60W 10/30; B60W 20/10; B60W 20/30; B60W 30/18054; B60K 6/387; B60K 6/46; B60K 6/48; B60K 6/547
USPC ........................................................ 701/22
See application file for complete search history.

(56) References Cited

U.S. PATENT DOCUMENTS

2013/0000444 A1    1/2013    Okubo et al.
2013/0138282 A1    5/2013    Shin et al.
(Continued)

FOREIGN PATENT DOCUMENTS

JP    2010-149538 A    7/2010
JP    2010-201962 A    9/2010
(Continued)

*Primary Examiner* — Calvin Cheung
*Assistant Examiner* — Paula L Schneider
(74) *Attorney, Agent, or Firm* — Oliff PLC

(57) ABSTRACT

An ECU executes control processing including a step of executing engagement control on a K0 clutch when a D→N operation is performed, a step of keeping the K0 clutch engaged until an N→D operation is performed, a step of executing engagement control on a C1 clutch when the N→D operation is performed, a step of keeping the K0 clutch engaged when a request to operate an engine is issued following the elapse of a predetermined time α, and a step of executing disengagement control on the K0 clutch when a request to operate the engine has not been issued.

9 Claims, 7 Drawing Sheets

(51) Int. Cl.
    *G05D 1/00*     (2006.01)
    *G05D 3/00*     (2006.01)
    *G06F 7/00*     (2006.01)
    *G06F 17/00*     (2006.01)
    *B60W 20/00*     (2016.01)
    *B60W 10/06*     (2006.01)
    *B60W 10/10*     (2012.01)
    *B60K 6/46*     (2007.10)
    *B60K 6/48*     (2007.10)
    *B60K 6/547*     (2007.10)
    *B60W 10/02*     (2006.01)
    *B60W 30/18*     (2012.01)
    *B60K 6/387*     (2007.10)
    *B60W 10/08*     (2006.01)
    *B60W 10/115*     (2012.01)
    *B60W 10/30*     (2006.01)

(52) U.S. Cl.
    CPC ..... *B60W 2540/16* (2013.01); *B60W 2710/06* (2013.01); *B60W 2710/10* (2013.01); *B60W 2710/1083* (2013.01); *Y10S 903/93* (2013.01); *Y10S 903/946* (2013.01)

(56) References Cited

U.S. PATENT DOCUMENTS

2014/0288754 A1*   9/2014   Kasuya ............ B60K 6/48
                                                                    701/22
2015/0298690 A1   10/2015   Onouchi et al.

FOREIGN PATENT DOCUMENTS

| | | |
|---|---|---|
| JP | 2013-112335 A | 6/2013 |
| JP | WO2013/108847 A1 | 7/2013 |
| WO | 2011/125446 A1 | 10/2011 |
| WO | 2014/051107 A1 | 4/2014 |

* cited by examiner

DRIVING APPARATUS FOR HYBRID VEHICLE AND CONTROL METHOD THEREOF

INCORPORATION BY REFERENCE

The disclosure of Japanese Patent Application No. 2014-105348, filed on May 21, 2014 including the specification, drawings and abstract, is incorporated herein by reference in its entirety.

BACKGROUND OF THE INVENTION

1. Field of the Invention

The invention relates to a driving apparatus for a hybrid vehicle and a control method thereof.

2. Description of Related Art

Japanese Patent Application Publication No. 2010-149538 (JP 2010-149538 A), discloses a vehicle installed with a predetermined hydraulic engagement apparatus that is engaged in order to switch a vehicle transmission apparatus to a power transmissible condition when a switch operation is performed from a non-driving position to a driving position.

SUMMARY OF THE INVENTION

A hybrid vehicle, described in JP 2010-149538A, that travels using at least one power source from among an engine and a motor may be provided with a first engagement element that is capable of engaging the engine and the motor, and a second engagement element that is capable of setting an automatic transmission that connects the power source to a drive wheel in a power transmission condition during startup of the vehicle, and in this case, it may be necessary to engage the first and second engagement elements simultaneously, for example when there is a requirement to start the vehicle in a non-power transmission condition (a requirement for engine operation and a hybrid travel, or the like) and to set the engine and the motor in the power transmissible condition. When the two engagement elements are operated in parallel, working oil must be supplied to the respective engagement elements. Therefore, a large amount of working oil than when the engagement elements are operated singly is required, and engagement of one of the engagement elements may be delayed.

The invention provides a driving apparatus for a hybrid vehicle and a control method thereof that appropriately controls a plurality of engagement elements configured to vary a power transmission condition between a power source and a drive wheel.

A first aspect of the invention provides a driving apparatus for a hybrid vehicle, the driving apparatus includes an internal combustion engine, an electric motor, a speed change unit, a first engagement element, a second engagement element, an oil pressure source, a selection unit, an electronic control unit. The speed change unit is configured to transmit power from at least one of the internal combustion engine and the electric motor to a drive wheel of the hybrid vehicle. The first engagement element is configured to engage between the internal combustion engine and the electric motor to establish a first power transmission condition. The second engagement element is configured to engage between an input shaft and an output shaft of the speed change unit to establish a second power transmission condition. The second engagement element is configured to disengage between the input shaft and the output shaft to establish a power cutoff condition. The oil pressure source is configured to supply working oil to the first engagement element and the second engagement element. The selection unit is configured to supply any of a plurality of shift ranges. The plurality of shift ranges includes a first range and a second range. The first range is established by setting the second engagement element in an engaged condition. The second range is established by setting the second engagement element in a disengaged condition. The electronic control unit is configured to control the first engagement element to engage between the internal combustion engine and the electric motor when the second range is selected by the selection unit.

By engaging the first engagement element when the second range is selected by the selection unit in this manner, working oil can be supplied to the first engagement element before the first range is selected. Therefore, when the first range is selected thereafter such that the second engagement element is engaged, an amount of required working oil can be reduced in comparison with a case where the first engagement element and the second engagement element are engaged in parallel.

In the driving apparatus, the electronic control unit may be configured to control the first engagement element to disengage between the internal combustion engine and the electric motor when the first range is selected after establishing the second range and a request to operate the internal combustion engine has not been issued.

Hence, when the first range is selected after establishing the second range and a request to operate the internal combustion engine has not been issued, the first engagement element is disengaged, and as a result, a reduction in fuel efficiency can be suppressed.

In the driving apparatus, the electronic control unit may be configured to control the first engagement element to engage between the internal combustion engine and the electric motor on condition that the second range is selected by the selection unit.

By engaging the first engagement element on condition that the second range is selected by the selection unit in this manner, working oil can be supplied to the first engagement element before the first range is selected. Therefore, when the first range is selected thereafter such that the second engagement element is engaged, the amount of required working oil can be reduced in comparison with a case where the first engagement element and the second engagement element are engaged in parallel.

The driving apparatus, the electronic control unit may be configured to maintain the first engagement element in the engaged condition on condition that the second range is selected by the selection unit when the first engagement element is engaged.

Hence, when the first range is selected after establishing the second range such that the second engagement element is engaged, the first engagement element is already in the engaged condition, and therefore the amount of required working oil can be reduced in comparison with a case where the first engagement element and the second engagement element are engaged in parallel. Moreover, since the first engagement element is in the engaged condition, the internal combustion engine can be operated quickly in response to a request to operate the internal combustion engine.

In the driving apparatus, the electronic control unit may be configured to control the first engagement element to engage between the internal combustion engine and the electric motor on condition that the second range is selected by the selection unit when the first engagement element is not engaged.

Hence, when the first range is selected after establishing the second range such that the second engagement element is engaged, the first engagement element is already in the engaged condition, and therefore the amount of required working oil can be reduced in comparison with a case where the first engagement element and the second engagement element are engaged in parallel. Moreover, since the first engagement element is in the engaged condition, the engine can be operated quickly in response to a request to operate the engine.

In the driving apparatus, the electronic control unit may be configured to maintain the first engagement element in the engaged condition when the first range is selected after establishing the second range and a request to operate the internal combustion engine has been issued.

Hence, when the first range is selected after establishing the second range and a request to operate the internal combustion engine has been issued, the first engagement element is maintained in the engaged condition, and therefore the internal combustion engine can be operated quickly.

The driving apparatus may further includes a third engagement element. The third engagement element may be configured to engage between the input shaft and the output shaft of the speed change unit to establish a third power transmission condition. In the driving apparatus, the plurality of shift ranges may further include a third range, the third range may be established by setting the third engagement element in the engaged condition. The electronic control unit may be configured to start to control the first engagement element to engage between the internal combustion engine and the electric motor after starting to control the third engagement element to engage between the input shaft and the output shaft of the speed change unit on condition that the third range is selected by the selection unit.

By starting to engage the first engagement element after starting to engage the third engagement element on condition that the third range is selected in this manner, the amount of required working oil can be reduced in comparison with a case where engagement of the first engagement element and engagement of the third engagement element are started simultaneously. Moreover, working oil can be supplied to the first engagement element before the first range is selected. Therefore, when the first range is selected thereafter such that the second engagement element is engaged, the amount of required working oil can be reduced in comparison with a case where the first engagement element and the second engagement element are engaged in parallel.

In the driving apparatus, the electronic control unit may be configured to control the first engagement element to engage between the internal combustion engine and the electric motor after engaging the third engagement element when the third range is selected by the selection unit.

Hence, when the third range is selected, the first engagement element is engaged after engaging the third engagement element, and therefore the amount of required working oil can be reduced in comparison with a case where the first engagement element and the third engagement element are engaged in parallel. Moreover, the first engagement element can be engaged before the first range is selected. Therefore, when the first range is selected thereafter such that the second engagement element is engaged, the amount of required working oil can be reduced in comparison with a case where the first engagement element and the second engagement element are engaged in parallel.

In the driving apparatus, the first range may be a forward travel range, and the third range may be a reverse travel range.

Hence, when the reverse travel range is established, engagement of the first engagement element is started before the forward travel range is selected. Therefore, when the forward travel range is selected thereafter such that the second engagement element is engaged, the amount of required working oil can be reduced in comparison with a case where the first engagement element and the second engagement element are engaged in parallel.

A second aspect of the invention provides a control method for a hybrid vehicle. The hybrid vehicle includes a driving apparatus, an internal combustion engine, an electric motor, a speed change unit, a first engagement unit, a second engagement unit, an oil pressure source, a selection unit. The speed change unit is configured to transmit power from at least one of the internal combustion engine and the electric motor to a drive wheel of the hybrid vehicle. The first engagement element is configured to engage between the internal combustion engine and the electric motor to establish a first power transmission condition. The second engagement element is configured to engage between an input shaft and an output shaft of the speed change unit to establish a second power transmission condition, and the second engagement element is configured to disengage between the input shaft and the output shaft to establish a power cutoff condition. The oil pressure source is configured to supply working oil to the first engagement element and the second engagement element. The selection unit is configured to select any of a plurality of shift ranges, the plurality of shift ranges including a first range and a second range, the first range being established by setting the second engagement element in an engaged condition and the second range being established by setting the second engagement element in a disengaged condition. The control method includes engaging the first engagement element when the second range is selected by the selection unit.

According to the invention, by engaging the first engagement element on condition that the second range is selected by the selection unit, working oil can be supplied to the first engagement element before the first range is selected. Therefore, when the first range is selected thereafter such that the second engagement element is engaged, the amount of required working oil can be reduced in comparison with a case where the first engagement element and the second engagement element are engaged in parallel. As a result, a driving apparatus for a hybrid vehicle that appropriately controls a plurality of clutches configured to vary a power transmission condition between a drive source and a drive wheel can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below with reference to the drawings. In the following description, identical reference symbols have been allocated to identical components, names and functions of which are likewise identical. Accordingly, detailed description of these components will not be repeated.

Figure 1:
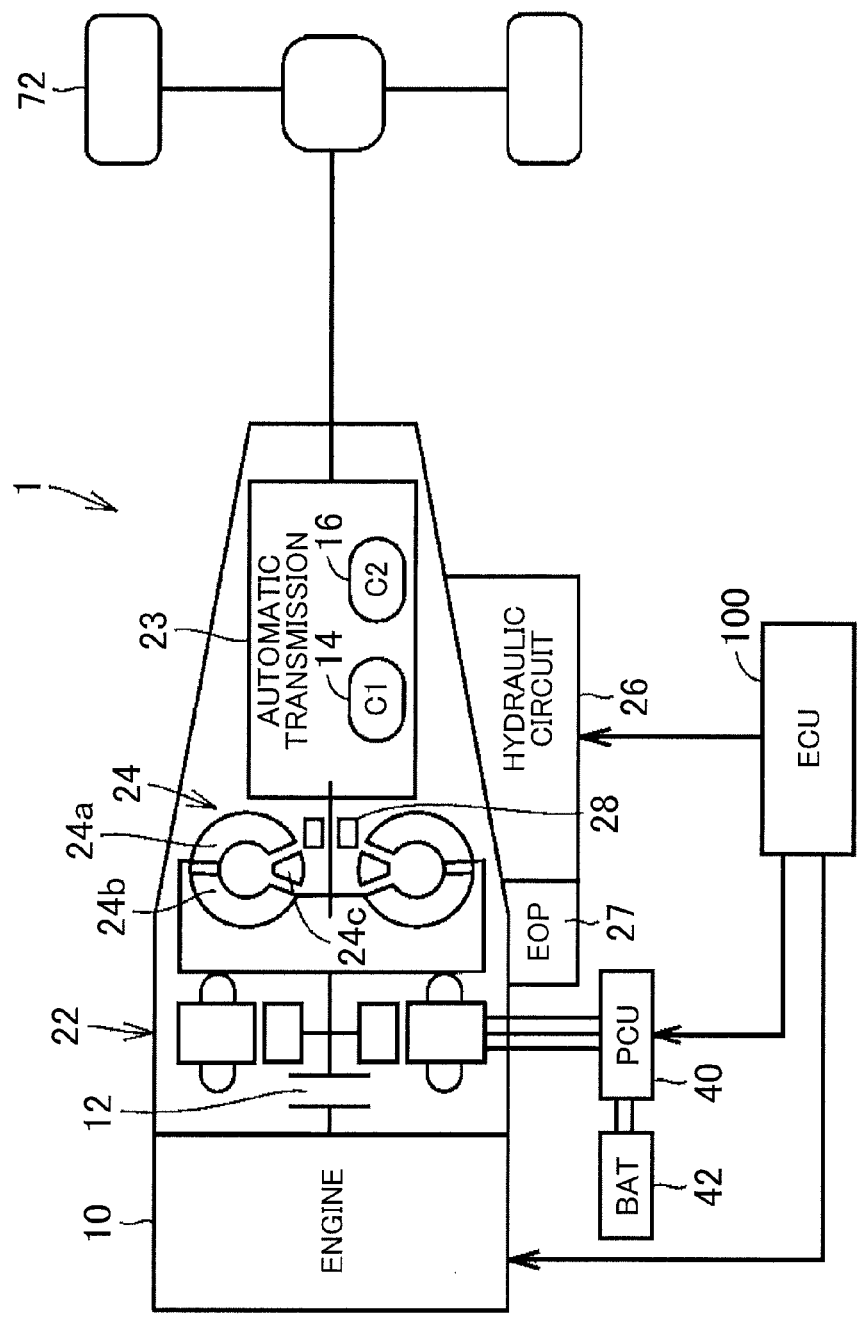
FIG. 1 is a view showing a configuration of a hybrid vehicle according to one embodiment of the invention.

As shown in FIG. 1, a vehicle 1 according to this embodiment includes an engine 10, a K0 clutch 12, a C1 clutch 14, a C2 clutch 16, a motor generator 22 (referred to as an MG 22 hereafter), an automatic transmission 23, a torque converter 24, a hydraulic circuit 26, an electric oil pump (EOP) 27, a mechanical oil pump (MOP) 28, a power control unit (PCU) 40, a battery 42, a drive wheel 72, and an electronic control unit (ECU) 100.

A crankshaft serving as an output shaft of the engine 10 and a rotary shaft of the MG 22 are connected via the K0 clutch 12. The rotary shaft of the MG 22 is connected to an input shaft of the torque converter 24. An output shaft of the torque converter 24 is connected to an input shaft of the automatic transmission 23. An output shaft of the automatic transmission 23 is connected to the drive wheel 72.

The MG 22 is a three-phase alternating current rotating electric machine, for example. The MG 22 is driven by power supplied thereto from the battery 42 via the PCU 40. The MG 22 functions as both a motor that generates a driving force of the vehicle 1 and a starter that starts the engine 10.

The torque converter 24 includes a pump impeller 24a, a turbine impeller 24b and a stator 24c. The pump impeller 24a is connected to the rotary shaft of the MG 22. The turbine impeller 24b is connected to the input shaft of the automatic transmission 23. The stator 24c is provided between the pump impeller 24a and the turbine impeller 24b. When a lockup clutch (not shown) is in an engaged condition, rotation of the input shaft and the output shaft of the torque converter 24 is synchronized, and when the lockup clutch is in a disengaged condition, synchronization of the rotation is released.

In this embodiment, the automatic transmission 23 will be described as a stepped automatic transmission that switches a plurality of gear positions continuously, for example. A plurality of shift ranges is set in the automatic transmission 23. The plurality of shift ranges include, for example, a forward travel range (referred to as a D range hereafter), a reverse travel range (referred to as an R range hereafter), a parking range (referred to as a P range hereafter), and a neutral range (referred to as an N range hereafter).

When the D range is selected as the shift range, for example, one gear position from a first speed gear position to an upper limit gear position is established in the automatic transmission 23 in accordance with operating conditions of the vehicle 1.

The automatic transmission 23 includes, for example, a speed change unit including one or a plurality of planetary gear mechanisms, and a plurality of engagement elements such as a brake that stops rotation of a rotary element of the planetary gear mechanism and a clutch that synchronizes the rotation of the rotary element with rotation of another rotary element.

When the gear position of the automatic transmission 23 is modified, one of the plurality of engagement elements such as the brake and the clutch is disengaged or engaged in order to set a predetermined engagement element (or a predetermined combination of engagement elements) corresponding to the modified gear position in an engaged condition and set an engagement element other than the predetermined engagement element (or an engagement element other than the predetermined combination of engagement elements) in a disengaged condition. In so doing, a ratio (a speed ratio) between the input shaft and the output shaft of the speed change unit (the automatic transmission 23) is modified, and as a result, the modified gear position is established.

In this embodiment, the automatic transmission 23 includes at least the C1 clutch 14 and the C2 clutch 16 as the plurality of engagement elements.

The C1 clutch 14 is an engagement element that is engaged to cause the vehicle 1 to start to travel forward (in other words, when the D range is selected and the first speed is established as the gear position). The C2 clutch 16 is an engagement element that is engaged to cause the vehicle 1 to start to travel in reverse (in other words, when the R range is selected). Note that when the C1 clutch 14 is engaged, the C2 clutch 16 is disengaged, and when the C2 clutch 16 is engaged, the C1 clutch 14 is disengaged.

The engine 10 is an internal combustion engine such as a gasoline engine or a diesel engine. The crankshaft of the engine 10 and the rotary shaft of the MG 22 are connected via the K0 clutch 12.

The K0 clutch 12 is engaged to establish a power transmission condition between the engine 10 and the MG 22 and disengaged to establish a power cutoff condition between the engine 10 and the MG 22.

The EOP 27 operates using a motor that is operated on the basis of a control signal from the ECU 100 as a power source. The MOP 28 operates in response to rotation of the pump impeller 24a using the engine 10 or the MG 22 as a power source. The EOP 27 and the MOP 28 both supply working oil stored in an oil pan 54 (see FIG. 2) to the hydraulic circuit 26.

The hydraulic circuit 26 supplies the working oil to at least one of the K0 clutch 12, the C1 clutch 14, and the C2 clutch 16 on the basis of a control signal from the ECU 100.

The K0 clutch 12, the C1 clutch 14, and the C2 clutch 16 are respectively engaged when a clutch piston is moved by oil pressure corresponding to the supplied amount of working oil supplied from the hydraulic circuit 26 such that friction is generated between two rotary bodies (a drive plate and a driven plate on which a friction material is provided) that receive and transmit power in each clutch, whereby a force for eliminating relative rotation between the two rotary bodies acts thereon (in other words, rotation of the two rotary bodies is synchronized).

The ECU 100 controls the hydraulic circuit 26 to engage at least one of the K0 clutch 12, the C1 clutch 14, and the C2 clutch 16 in accordance with the operating conditions of the vehicle 1.

For example, when a request is issued to operate the engine 10 while the K0 clutch 12 is disengaged and the engine 10 is stopped, the ECU 100 engages the K0 clutch 12. As a result, the power transmission condition is established between the engine 10 and the MG 22. Accordingly, the engine 10 can be operated by cranking the engine 10 using the MG 22 or, during coasting by the vehicle 1, cranking the engine 10 using the rotation of the rotary shaft of the MG 22. When the engine 10 is operated, the vehicle 1 travels using power from the engine 10 or power from both the engine 10 and the MG 22. Further, the battery 42 can be charged using power generated by operating the engine 10 or, during coasting by the vehicle 1, power generated in the MG 22.

When, on the other hand, a request is issued to stop the engine 10 while the K0 clutch 12 is engaged and the engine 10 is operative, for example, the ECU 100 disengages the K0 clutch 12 and stops the operation of the engine 10.

The ECU 100 issues requests to operate the engine 10 and stop the engine 10 in accordance with the operating conditions of the vehicle 1. For example, the ECU 100 may calculate a power (a required power) required by the vehicle 1 on the basis of an operation amount of an accelerator pedal (not shown) and a speed of the vehicle 1. The ECU 100 may then issue a request to operate the engine 10 when the required power exceeds a threshold, and issue a request to stop the engine 10 when the required power falls below the threshold.

Figure 2:
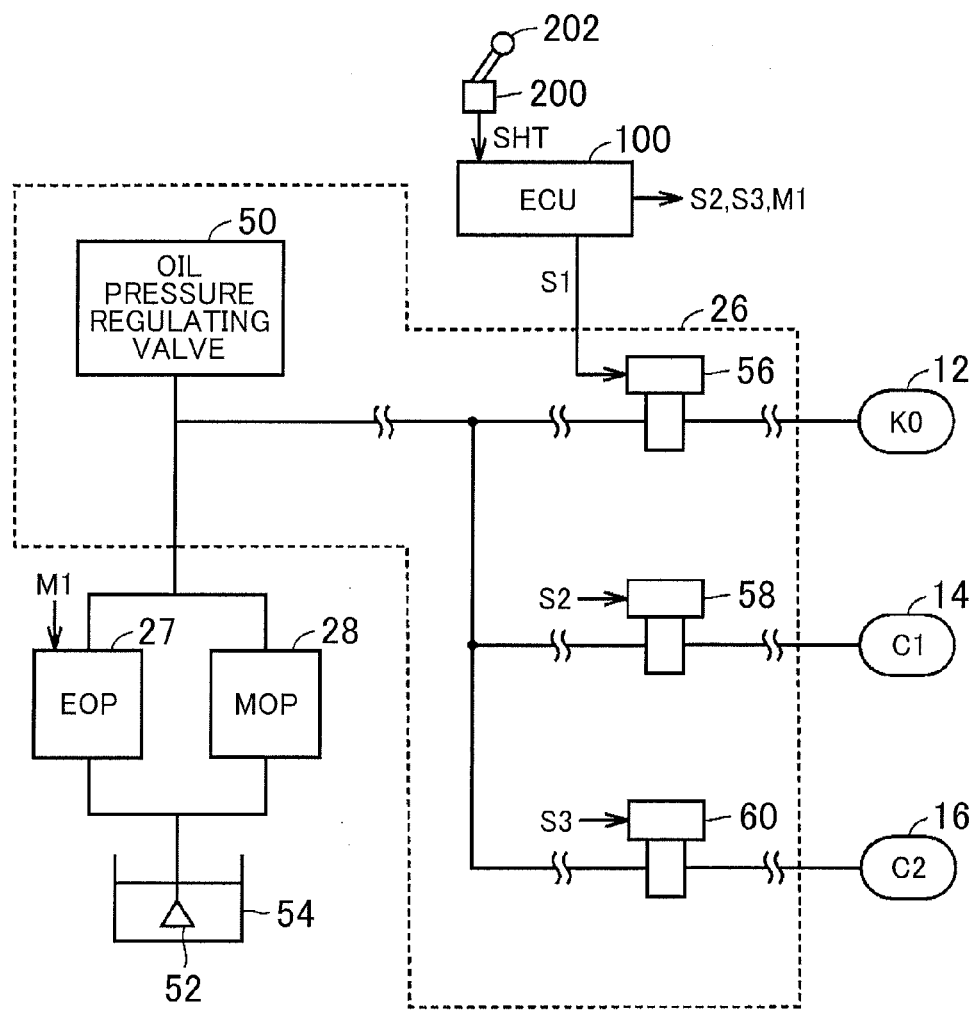
FIG. 2 is a view showing a configuration of a hydraulic circuit of the embodiment.

FIG. 2 shows a configuration of the hydraulic circuit 26. The hydraulic circuit 26 includes an oil pressure regulating valve 50, a first solenoid valve 56, a second solenoid valve 58, and a third solenoid valve 60.

When at least one of the EOP 27 and the MOP 28 is operated, the working oil stored in the interior of the oil pan 54 is suctioned through a strainer 52 and discharged into the hydraulic circuit 26. Note that the EOP 27 operates on the basis of a control signal M1 from the ECU 100.

The oil pressure regulating valve 50 regulates an oil pressure of the working oil discharged from at least one of the EOP 27 and the MOP 28 to a predetermined oil pressure (a line pressure).

The oil pressure regulated by the oil pressure regulating valve 50 is supplied respectively to the first solenoid valve 56, the second solenoid valve 58, and the third solenoid valve 60.

The first solenoid valve 56 adjusts an oil pressure supplied to the K0 clutch 12 in accordance with an instructed pressure (referred to hereafter as a K0 instructed pressure) based on a control signal S1 from the ECU 100 using the oil pressure regulated by the oil pressure regulating valve 50 as a source pressure.

The second solenoid valve 58 adjusts an oil pressure supplied to the C1 clutch 14 in accordance with an instructed pressure (referred to hereafter as a C1 instructed pressure) based on a control signal S2 from the ECU 100 using the oil pressure regulated by the oil pressure regulating valve 50 as a source pressure.

The third solenoid valve 60 adjusts an oil pressure supplied to the C2 clutch 16 in accordance with an instructed pressure (referred to hereafter as a C2 instructed pressure) based on a control signal S3 from the ECU 100 using the oil pressure regulated by the oil pressure regulating valve 50 as a source pressure.

A shift position sensor 200 that detects a position of a shift lever 202 is connected to the ECU 100. The shift position sensor 200 transmits a signal SHT indicating a detection result of the position of the shift lever 202 to the ECU 100.

The ECU 100 specifies the shift range selected by a driver on the basis of the signal SHT from the shift position sensor 200. For example, when the driver moves the shift lever 202 to a position corresponding to the D range, the shift position sensor 200 transmits a signal SHT corresponding to the D range to the ECU 100. On the basis of the signal SHT from the shift position sensor, the ECU 100 specifies the D range as the shift range selected by the driver.

To switch the shift range from the N range to the D range, for example, while the vehicle 1 having the above configuration is stopped, the driver may issue a request to engage both the K0 clutch 12 and the C1 clutch 14 by greatly depressing the accelerator pedal or the like. When working oil is supplied to both of the clutches in order to operate the clutches, the clutch pistons of the two clutches must be moved to positions in which the respective clutches enter the engaged condition, and for this purpose, a larger amount of working oil must be supplied than in a case where the clutches are operated singly.

Hence, in this embodiment, the ECU 100 engages the K0 clutch 12 on condition that the N range has been selected by the driver by operating the shift lever 202.

Note that when the K0 clutch is engaged, the ECU 100 maintains the K0 clutch 12 in the engaged condition on condition that the N range is selected.

Further, in a case where the D range is selected after establishing the N range, the ECU 100 disengages the K0 clutch 12 when a request to operate the engine 10 has not been issued, and maintains the K0 clutch 12 in the engaged condition when a request to operate the engine 10 has been issued.

Furthermore, the ECU 100 starts to engage the K0 clutch 12 after starting to engage the C2 clutch 16 on condition that the R range has been selected by the driver by operating the shift lever 202.

Figure 3:
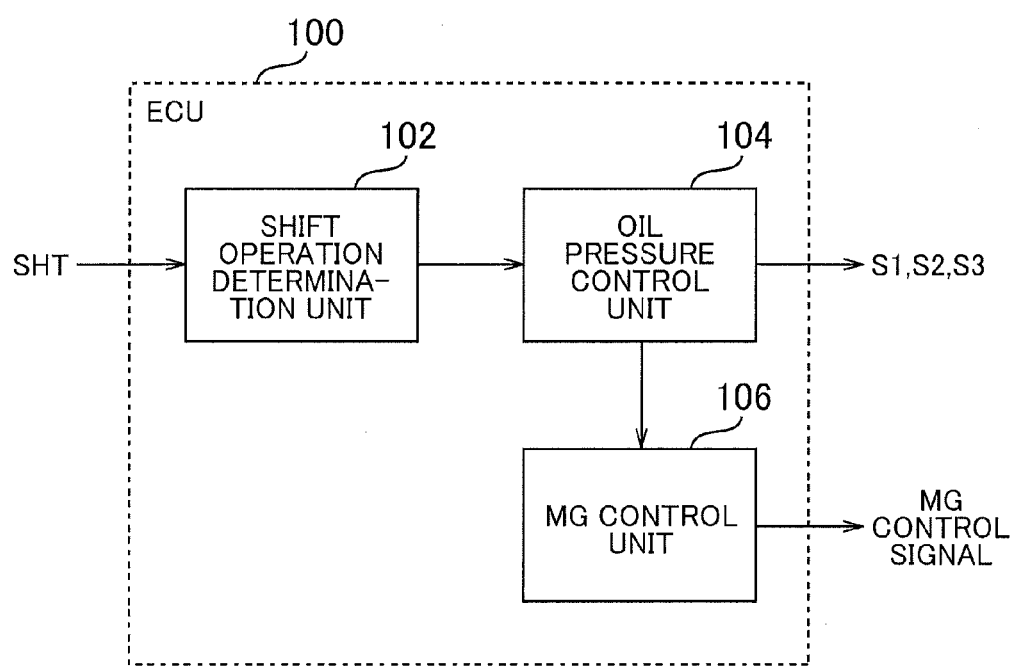
FIG. 3 is a block diagram showing functions of an electronic control unit (ECU) of the embodiment.

FIG. 3 is a block diagram showing functions of the ECU 100 installed in the vehicle 1 according to this embodiment. The ECU 100 includes a shift operation determination unit 102, an oil pressure control unit 104, and an MG control unit 106. Note that these configurations may be realized by software such as programs, or by hardware.

The shift operation determination unit 102 determines whether or not the N range has been selected (whether or not a D→N operation has been performed) in a case where the D range is set as the shift range on the basis of the signal SHT from the shift position sensor 200. After determining that the D→N operation has been performed, the shift operation determination unit 102 may set a D→N operation determination flag in an ON condition, for example.

The shift operation determination unit 102 determines whether or not the D range has been selected (whether or not an N→D operation has been performed) in a case where the N range is set as the shift range on the basis of the signal SHT from the shift position sensor 200. After determining that the N→D operation has been performed, the shift operation determination unit 102 may set an N→D operation determination flag in an ON condition, for example.

The shift operation determination unit 102 determines whether or not the R range has been selected (whether or not a D→R operation has been performed) in a case where the D range is set as the shift range on the basis of the signal SHT from the shift position sensor 200. After determining that the D→R operation has been performed, the shift operation determination unit 102 may set a D→R operation determination flag in an ON condition, for example.

The shift operation determination unit 102 determines whether or not the D range has been selected (whether or not an R→D operation has been performed) in a case where the R range is set as the shift range on the basis of the signal SHT from the shift position sensor 200. After determining that the R→D operation has been performed, the shift operation determination unit 102 may set an R→D operation determination flag in an ON condition, for example.

When the shift operation determination unit 102 determines that the D→N operation has been performed and the K0 clutch 12 is disengaged, the oil pressure control unit 104 controls the hydraulic circuit 26 to disengage the C1 clutch 14 and engage the K0 clutch 12. Note that the oil pressure control unit 104 may disengage the C1 clutch 14 and start to engage the K0 clutch 12 when the D→N operation determination flag enters the ON condition, for example. Further, in the following description, control performed by the hydraulic circuit 26 to disengage a clutch will be referred to as disengagement control, and control performed by the hydraulic circuit 26 to engage a clutch will be referred to as engagement control.

Further, when the shift operation determination unit 102 determines that the D→N operation has been performed and the K0 clutch 12 is engaged, the oil pressure control unit 104 disengages the C1 clutch 14 and maintains the K0 clutch 12 in the engaged condition.

When the shift operation determination unit 102 determines that the N→D operation has been performed, the oil pressure control unit 104 executes the engagement control on the C1 clutch 14. Note that the oil pressure control unit 104 may start to engage the C1 clutch 14 when the N→D operation determination flag enters the ON condition, for example.

Once a predetermined time α has elapsed after it is determined that the N→D operation has been performed, the oil pressure control unit 104 executes the disengagement control on the K0 clutch 12 when a request to operate the engine 10 has not been issued, and maintains the K0 clutch 12 in the engaged condition by maintaining the K0 instructed pressure when a request to operate the engine 10 has been issued. The predetermined time α is a time during which the K0 clutch 12 is kept engaged in preparation for an engine operation request, and may be set at any time during which sufficient working oil is supplied to the C1 clutch 14 following the N→D operation so that a determination can be made as to whether or not a request to operate the engine 10 has been issued. The predetermined time α may be determined in advance or on the basis of the operating conditions of the vehicle 1.

Note that the oil pressure control unit 104 may control the oil pressure supplied to the K0 clutch 12 in accordance with whether or not a request to operate the engine 10 has been issued when the predetermined time α elapses after the N→D operation determination flag enters the ON condition, for example.

When the shift operation determination unit 102 determines that the D→R operation has been performed, on the other hand, the oil pressure control unit 104 executes the disengagement control on the C1 clutch 14 and the engagement control on the C2 clutch 16. Note that the oil pressure control unit 104 may execute the disengagement control on the C1 clutch 14 and the engagement control on the C2 clutch 16 when the D→R operation determination flag enters the ON condition, for example.

When the K0 clutch 12 is disengaged following the elapse of a predetermined time β after it is determined that the D→R operation has been performed, the oil pressure control unit 104 executes the engagement control on the K0 clutch 12.

The predetermined time β is preferably set at least at a longer time than a time required for the clutch piston of the C2 clutch 16 to complete a movement (a clutch stroke) to a position immediately before engagement following the D→R operation. For example, the predetermined time β may be a time required for the C2 clutch 16 to complete engagement following selection of the R range. Note that completion of the clutch stroke may be determined on the basis of a detection result from a sensor that detects a stroke amount of the clutch piston of the C2 clutch 16 or a detection result of a sensor that detects the oil pressure supplied to the C2 clutch 16 instead of a time.

Note that the oil pressure control unit 104 may execute the engagement control on the K0 clutch 12 when the predetermined time β elapses after the D→R operation determination flag enters the ON condition.

Further, when the K0 clutch 12 is engaged following the elapse of the predetermined time β after it is determined that the D→R operation has been performed, the oil pressure control unit 104 maintains the K0 clutch 12 in the engaged condition.

When it is determined that the R→D operation has been performed, the oil pressure control unit 104 executes the engagement control on the C1 clutch 14 and the disengagement control on the C2 clutch 16. Note that the oil pressure control unit 104 may execute the engagement control on the C1 clutch 14 and the disengagement control on the C2 clutch 16 when the R→D operation determination flag enters the ON condition, for example.

Once a predetermined time γ has elapsed after determining that the R→D operation has been performed, the oil pressure control unit 104 executes the disengagement control on the K0 clutch 12 when a request to operate the engine 10 has not been issued, and maintains the K0 clutch 12 in the engaged condition when a request to operate the engine 10 has been issued. Note that the oil pressure control unit 104 may control the oil pressure supplied to the K0 clutch 12 in accordance with whether or not a request to operate the engine 10 has been issued when the predetermined time γ elapses after the R→D operation determination flag enters the ON condition, for example. The predetermined time γ may be set at any time during which a determination can be made as to whether or not a request to operate the engine 10 has been issued following the R→D operation, and may be determined in advance or on the basis of the operating conditions of the vehicle 1.

When the K0 clutch 12 is engaged after determining that the R→D operation has been performed, the MG control unit 106 controls an output torque of the MG 22 to ensure that torque variation generated by engaging the K0 clutch 12 is not transmitted to the drive wheel 72. More specifically, the MG control unit 106 controls the PCU 40 so that sufficient torque to make up for (compensate for) drag torque of the engine 10, which increases steadily as the K0 clutch 12 approaches the engaged condition, is generated in the MG 22.

Figure 4:
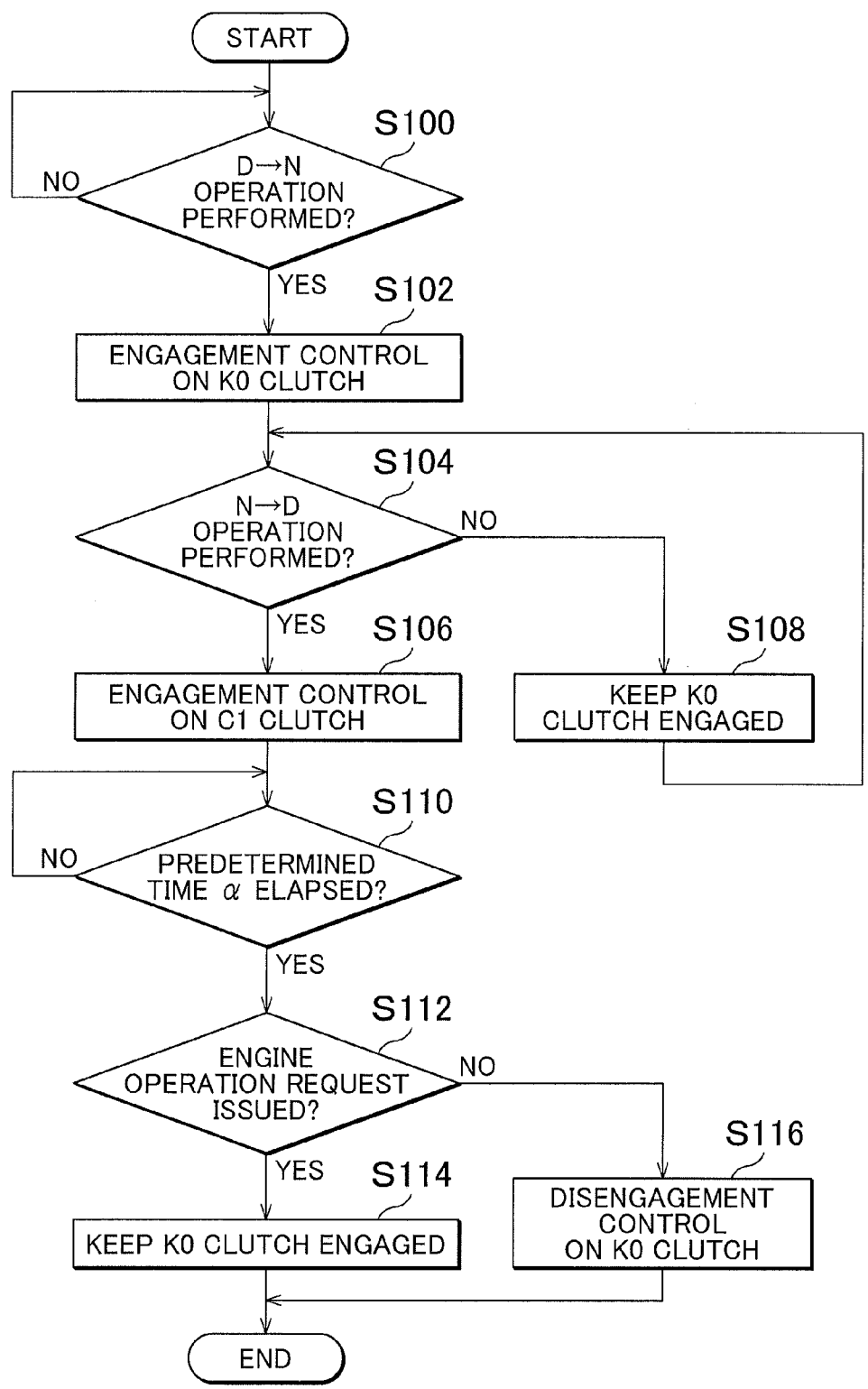
FIG. 4 is a flowchart showing control processing executed by the ECU during a D→N operation of the embodiment.

Referring to FIG. 4, control processing executed during the D→N operation by the ECU 100 installed in the vehicle 1 according to this embodiment will be described.

In step (steps will be referred to hereafter as S) 100, the ECU 100 determines whether or not the D→N operation has been performed. When it is determined that the D→N operation has been performed (YES in S100), the processing advances to S102. When it is determined that the D→N operation has not been performed (NO in S100), the processing returns to S100.

In S102, the ECU 100 executes the engagement control on the K0 clutch 12. In S104, the ECU 100 determines whether or not the N→D operation has been performed. When it is determined that the N→D operation has been performed (YES in S104), the processing advances to S106. When it is determined that the N→D operation has not been performed (NO in S104), the processing advances to S108.

In S106, the ECU 100 executes the engagement control on the C1 clutch 14. In S108, the ECU 100 maintains the K0 clutch 12 in the engaged condition.

In S110, the ECU 100 determines whether or not the predetermined time α has elapsed following the N→D operation. When it is determined that the predetermined time α has elapsed (YES in S110), the processing advances to S112. When it is determined that the predetermined time α has not elapsed (NO in S110), the processing returns to S110.

In S112, the ECU 100 determines whether or not a request to operate the engine 10 has been issued. When it is determined that a request to operate the engine 10 has been issued (YES in S112), the processing advances to S114. When it is determined that a request to operate the engine 10 has not been issued (NO in S112), the processing advances to S116.

In S114, the ECU 100 maintains the K0 clutch 12 in the engaged condition. In S116, the ECU 100 executes the disengagement control on the K0 clutch 12.

Figure 5:
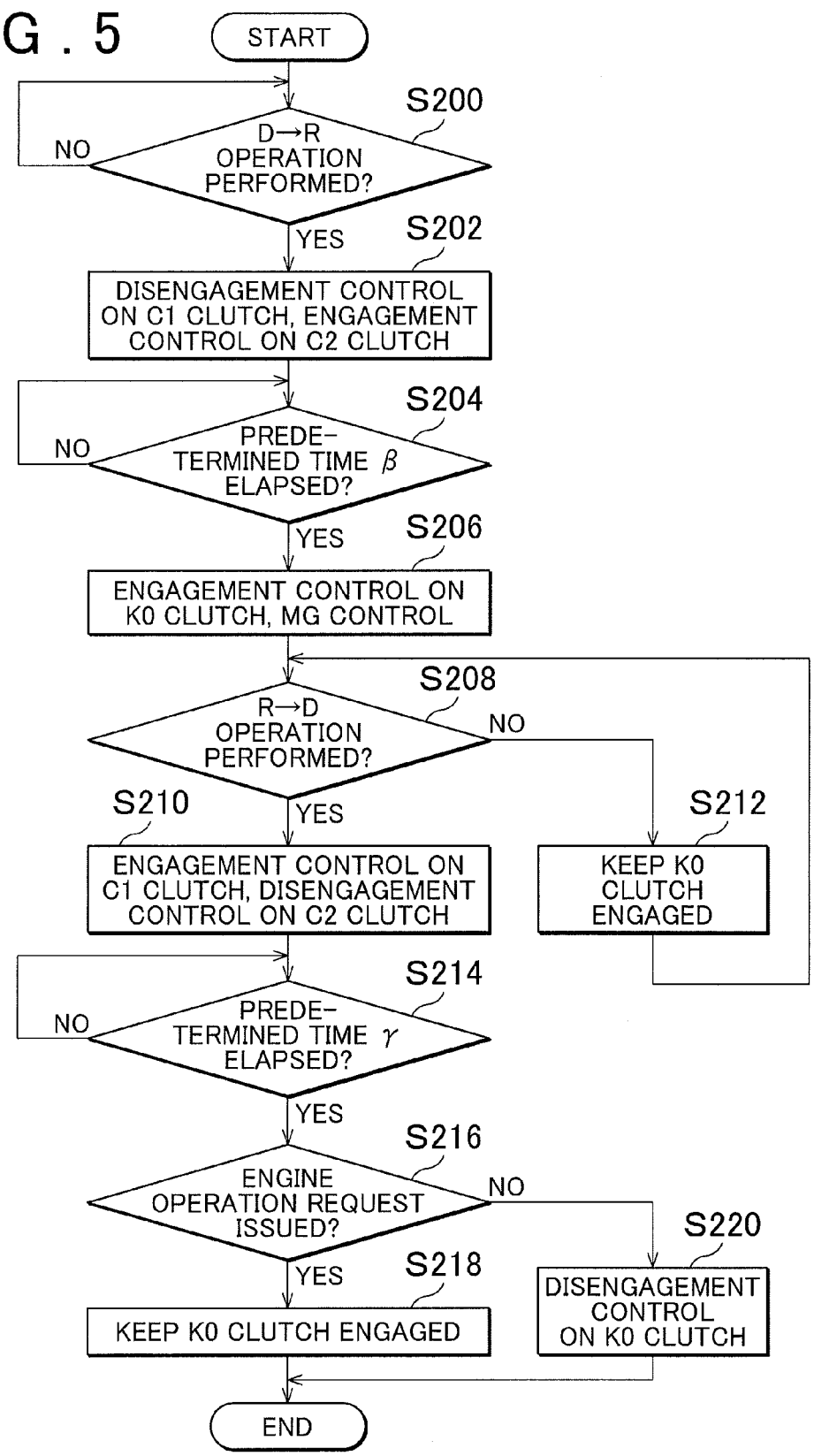
FIG. 5 is a flowchart showing control processing executed by the ECU during a D→R operation of the embodiment.

Next, referring to FIG. 5, control processing executed during the D→R operation by the ECU 100 installed in the vehicle 1 according to this embodiment will be described.

In S200, the ECU 100 determines whether or not the D→R operation has been performed. When it is determined that the D→R operation has been performed (YES in S200), the processing advances to S202. When it is determined that the D→R operation has been performed (NO in S200), the processing returns to S200.

In S202, the ECU 100 executes the disengagement control on the C1 clutch 14 and executes the engagement control on the C2 clutch 16. In S204, the ECU 100 determines whether or not the predetermined time β has elapsed following the D→R operation. When it is determined that the predetermined time β has elapsed following the D→R operation (YES in S204), the processing advances to S206. When it is determined that the predetermined time β has not elapsed e (NO in S204) the processing returns to S204.

In S206, the ECU 100 executes the engagement control on the K0 clutch 12 together with the MG control. In S208, the ECU 100 determines whether or not the R→D operation has been performed. When it is determined that the R→D operation has been performed (YES in S208), the processing advances to S210. When it is determined that the R→D operation has not been performed (NO in S208), the processing advances to S212.

In S210, the ECU 100 executes the engagement control on the C1 clutch 14 and executes the disengagement control on the C2 clutch 16. In S212, the ECU 100 maintains the K0 clutch 12 in the engaged condition.

In S214, the ECU 100 determines whether or not the predetermined time γ has elapsed following the R→D operation. When it is determined that the predetermined time γ has elapsed following the R→D operation (YES in S214), the processing advances to S216. When it is determined that the predetermined time γ has not elapsed (NO in S214), the processing returns to S214.

In S216, the ECU 100 determines whether or not a request to operate the engine 10 has been issued. When it is determined that a request to operate the engine 10 has been issued (YES in S216), the processing advances to S218. When it is determined that a request to operate the engine 10 has not been issued (NO in S216), the processing advances to S220.

In S218, the ECU 100 maintains the K0 clutch 12 in the engaged condition. In S220, the ECU 100 executes the disengagement control on the K0 clutch 12.

Operations of the ECU 100 installed in the vehicle 1 according to this embodiment, which are based on the structures and flowcharts described above, will now be described using FIGS. 6 and 7.

[Operation of ECU 100 During D→N Operation]

Figure 6:
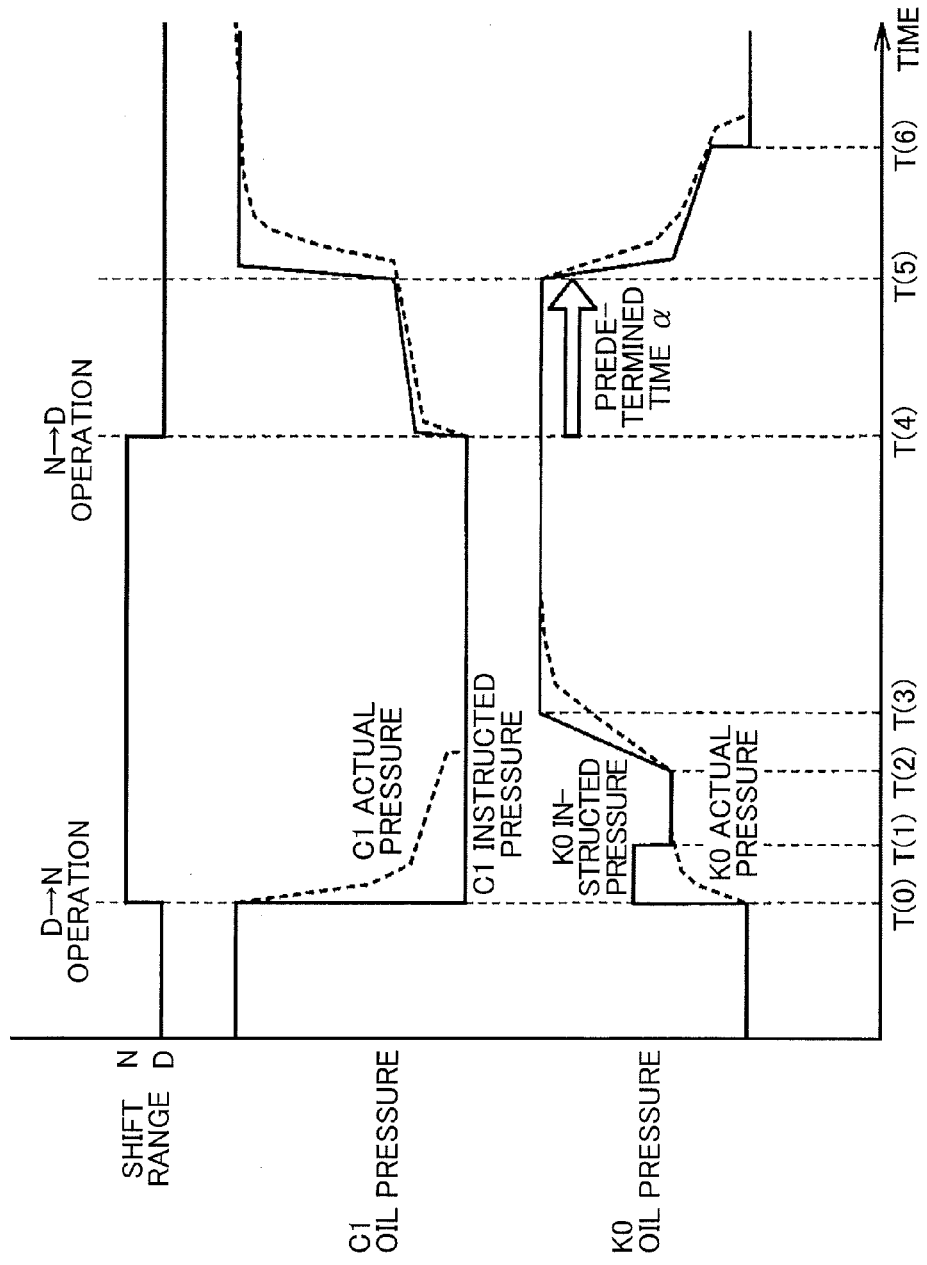
FIG. 6 is a view illustrating an operation of the ECU during the D→N operation of the embodiment.

A case in which the K0 clutch 12 is in the disengaged condition and the selected shift range is the D range, for example, is envisaged. At this time, as shown in FIG. 6, a case in which the engaged condition is maintained in the C1 clutch 14 is envisaged.

When the D→N operation is performed by the driver (YES in S100) at a time T(0), the disengagement control is executed on the C1 clutch 14 and the engagement control is executed on the K0 clutch 12 (S102).

When the disengagement control is executed on the C1 clutch 14, the ECU 100 reduces the C1 instructed pressure in a single step to an oil pressure (zero, for example) corresponding to the disengaged condition of the C1 clutch 14. As a result, an actual pressure (referred to hereafter as a C1 actual pressure) of the C1 clutch 14 decreases over time in response to the variation in the C1 instructed pressure until the C1 clutch 14 enters the disengaged condition.

When the engagement control is executed on the K0 clutch 12, the ECU 100 sets the K0 instructed pressure at a predetermined initial pressure from the time T(0) to a time T(1). Then, from the time T(1) to a time T(2), the ECU 100 sets the K0 instructed pressure at a predetermined standby pressure that is lower than the predetermined initial pressure. Hence, from the time T(0) to the time T(2), working oil is supplied to the K0 clutch 12 such that the oil pressure of the K0 clutch 12 increases, and in response to this pressure increase, the clutch piston moves to the position immediately before engagement, whereby the stroke of the clutch piston is completed.

From the time T(2) to a time T(3), the ECU 100 increases the K0 instructed pressure by a predetermined variation amount to an instructed pressure corresponding to the engaged condition. As a result, an actual pressure (referred to hereafter as a K0 actual pressure) of the K0 clutch 12 increases in response to the variation in the K0 instructed pressure until the K0 clutch 12 enters the engaged condition.

Note that a period in which the predetermined initial pressure is output and a period in which the predetermined standby pressure is output may be determined either in advance or in accordance with the operating conditions of the vehicle 1. Further, the initial pressure, the standby pressure, and an amount by which the K0 instructed pressure is varied from the time T(3) onward may be determined in accordance with the operating conditions of the vehicle 1.

The N→D operation is not performed (NO in S104) before a time T(4), and therefore the K0 clutch 12 is maintained in the engaged condition (S108). When the N→D operation is performed (YES in S104) at the time T(4), the engagement control is executed on the C1 clutch 14 (S106).

When the engagement control is started on the C1 clutch 14, the ECU 100 increases the C1 instructed pressure in a single step to a predetermined instructed pressure at the time T(4), and then increases the C1 instructed pressure by a first variation amount from the time T(4) to a time T(5). Accordingly, the C1 actual pressure increases over time in response to the variation in the C1 instructed pressure. As a result, the clutch piston of the C1 clutch 14 moves to the position immediately before engagement, whereby the clutch stroke is completed.

At the time T(5), the ECU 100 increases the C1 instructed pressure in a single step by a second variation amount that is larger than the first variation amount. As a result, the C1 actual pressure increases over time in response to the variation in the C1 instructed pressure until the C1 clutch 14 enters the engaged condition.

From the time T(4) until the predetermined time α elapses (NO in S110), the K0 clutch 12 is maintained in the engaged condition. When the predetermined time α elapses (YES in S110) at the time T(5), providing a request to operate the engine 10 has not been issued (NO in S112), the disengagement control is executed on the K0 clutch 12. Note that the predetermined time α may be of an identical length or a different length to a period required to increase the C1 instructed pressure by the second variation amount following the N→D operation.

When the disengagement control is executed on the K0 clutch 12, the ECU 100 reduces the K0 instructed pressure to a predetermined instructed pressure that is larger than an instructed pressure (zero, for example) corresponding to the disengaged condition, and then reduces the K0 instructed pressure by a predetermined variation amount. At a time T(6), the ECU 100 reduces the K0 instructed pressure to the instructed pressure corresponding to the disengaged condition. As a result, the K0 actual pressure decreases over time in response to the variation in the K0 instructed pressure until the K0 clutch 12 enters the disengaged condition.

Hence, a period (the time T(0) to the time T(2)) in which the working oil supply amount is increased in order to move the clutch piston of the K0 clutch 12 can be prevented from overlapping a period (the time T(4) to the time T(5)) in which the working oil supply amount is increased in order to move the clutch piston of the C1 clutch 14. Therefore, when both the K0 clutch 12 and the C1 clutch 14 are engaged, the required working oil supply amount can be reduced in comparison with a case where the K0 clutch 12 and the C1 clutch 14 are engaged in parallel.

[Operation of ECU 100 During D→R Operation]

Figure 7:
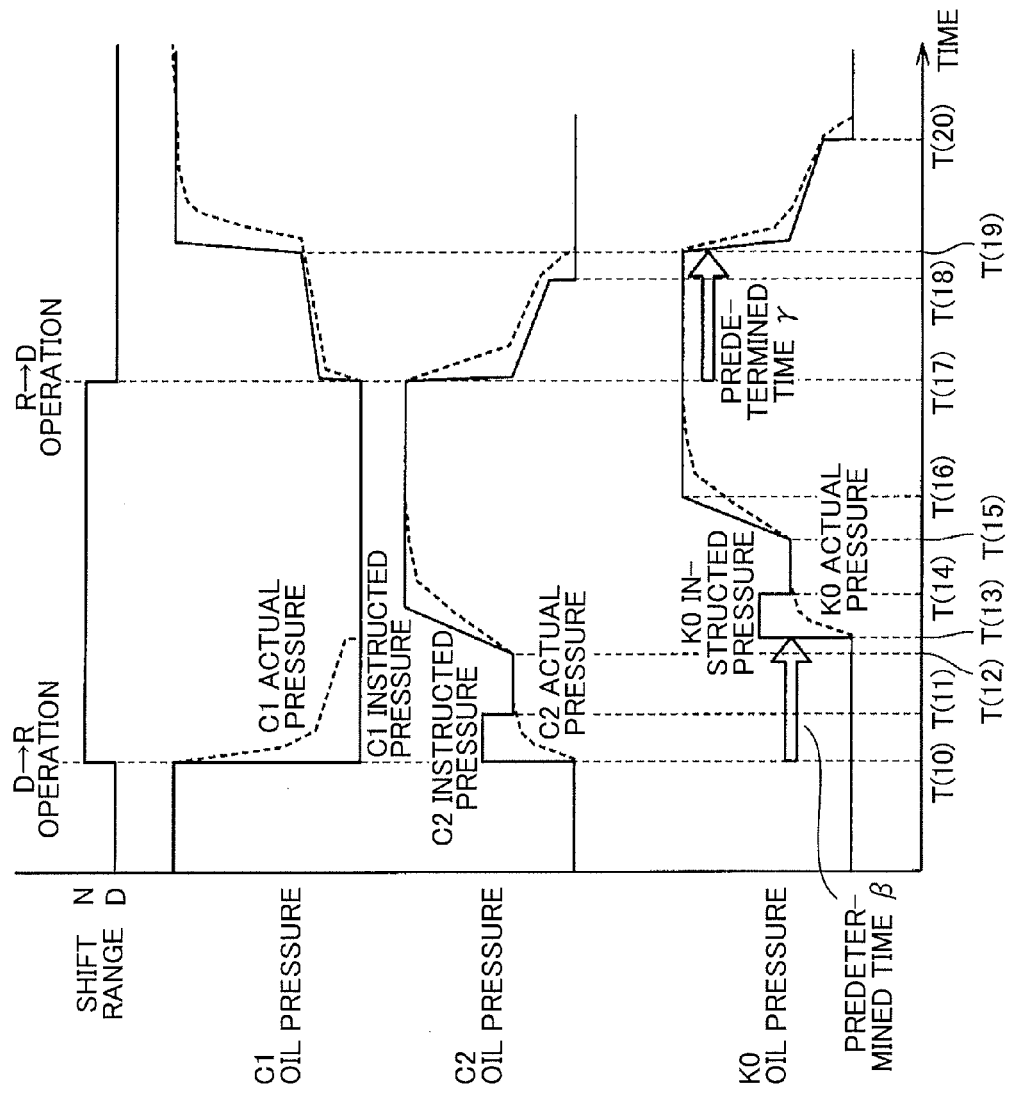
FIG. 7 is a view illustrating an operation of the ECU during the D→R operation of the embodiment.

A case in which the K0 clutch 12 is in the disengaged condition and the selected shift range is the D range, for example, is envisaged. At this time, as shown in FIG. 7, a case in which the engaged condition is maintained in the C1 clutch 14 and the disengaged condition is maintained in the C2 clutch 16 is envisaged.

When the D→R operation is performed (YES in S200) at a time T(10), the disengagement control is executed on the C1 clutch 14 and the engagement control is executed on the C2 clutch 16 (S202). Note that the disengagement control executed on the C1 clutch 14 is as described above, and therefore detailed description thereof will not be repeated.

Moreover, during the engagement control executed on the C2 clutch 16, the C2 instructed pressure varies in a similar manner to the manner in which the K0 instructed pressure varies during the engagement control executed on the K0 clutch 12, and therefore detailed description thereof will not be repeated.

The ECU 100 outputs a predetermined initial pressure (the time T(10) to a time T(11)) and a predetermined standby pressure (the time T(11) to a time T(12)) to the third solenoid valve 60 as the C2 instructed pressure. Accordingly, working oil is supplied to the C2 clutch 16 such that an actual pressure (referred to hereafter as a C2 actual pressure) of the C2 clutch 16 increases over time in response to the variation in the C2 instructed pressure. As a result, the clutch piston of the C2 clutch 16 moves to the position immediately before engagement, whereby the clutch stroke is completed.

From the time T(12), the C2 actual pressure increases in response to the variation in the C2 instructed pressure, which is increased by a predetermined variation amount, until the C2 clutch 16 enters the engaged condition.

At a time T(13), when the predetermined time β elapses (YES in S204) following the D→R operation, the engagement control is executed on the K0 clutch 12 and the MG control is executed (S206).

The ECU 100 outputs a predetermined initial pressure (the time T(13) to a time T(14)) and a predetermined standby pressure (the time T(14) to a time T(15)) as the K0 instructed pressure, and then increases the K0 instructed pressure by a predetermined variation amount from the time T(15) to a time T(16). Hence, from the time T(13) to the time T(14), the clutch piston of the K0 clutch 12 moves to the position immediately before engagement, whereby the clutch stroke is completed. From the time T(15), the K0 actual pressure increases in response to the variation in the K0 instructed pressure until the K0 clutch 12 enters the engaged condition.

The R→D operation is not performed (NO in S208) before a time T(17), and therefore the K0 clutch 12 is maintained in the engaged condition (S212).

When the R→D operation is performed (YES in S208) at the time T(17), the engagement control is executed on the C1 clutch 14 and the disengagement control is executed on the C2 clutch 16 (S210).

When the engagement control is started on the C1 clutch 14, the ECU 100 increases the C1 instructed pressure by the first variation amount from the time T(17) to a time T(19). Accordingly, the C1 actual pressure increases over time in response to the variation in the C1 instructed pressure. As a result, the clutch piston of the C1 clutch 14 moves to the position immediately before engagement, whereby the clutch stroke is completed.

At the time T(19), the ECU 100 increases the C1 instructed pressure in a single step by the second variation amount. As a result, the C1 actual pressure increases over time in response to the variation in the C1 instructed pressure until the C1 clutch 14 enters the engaged condition.

When the disengagement control is executed on the C2 clutch 16, the ECU 100 reduces the C2 instructed pressure to a predetermined instructed pressure that is larger than the instructed pressure (zero, for example) corresponding to the disengaged condition, and then reduces the C2 instructed pressure by a predetermined variation amount. At a time T(18), the ECU 100 reduces the C2 instructed pressure to the instructed pressure corresponding to the disengaged condition. As a result, the C2 actual pressure decreases over time in response to the variation in the C2 instructed pressure until the C2 clutch 16 enters the disengaged condition.

From the time T(17) until the predetermined time γ elapses (NO in S214), the K0 clutch 12 is maintained in the engaged condition. When the predetermined time γ elapses (YES in S214) at the time T(19), providing a request to operate the engine 10 has not been issued (NO in S216), the disengagement control is executed on the K0 clutch 12. Note that the predetermined time γ may be of an identical length or a different length to a period required to increase the C1 instructed pressure by the second variation amount following the R→D operation.

The disengagement control executed on the K0 clutch 12 is as described above, and therefore detailed description thereof will not be repeated. At a time T(20), the ECU 100 reduces the K0 instructed pressure to the instructed pressure corresponding to the disengaged condition. As a result, the K0 actual pressure decreases over time in response to variation in the K0 instructed pressure until the K0 clutch 12 enters the disengaged condition.

Hence, a period (the time T(10) to the time T(12)) in which the working oil supply amount is increased in order to move the clutch piston of the C2 clutch 16 can be prevented from overlapping a period (the time T(13) to the time T(15)) in which the working oil supply amount is increased in order to move the clutch piston of the K0 clutch 12. Therefore, when both the C2 clutch 16 and the K0 clutch 12 are engaged, the required working oil supply amount can be reduced in comparison with a case where the C2 clutch 16 and the K0 clutch 12 are engaged in parallel.

Furthermore, the period (the time T(13) to the time T(15)) in which the working oil supply amount is increased in order to move the clutch piston of the K0 clutch 12 can be prevented from overlapping a period (the time T(17) to the time T(19)) in which the working oil supply amount is increased in order to move the clutch piston of the C1 clutch 14. Therefore, when both the K0 clutch 12 and the C1 clutch 14 are engaged, the required working oil supply amount can be reduced in comparison with a case where the K0 clutch 12 and the C1 clutch 14 are engaged in parallel.

With the driving apparatus for a hybrid vehicle according to this embodiment, as described above, by engaging the K0 clutch 12 on condition that the N range is selected, working oil can be supplied to the K0 clutch 12 before the D range is selected. More particularly, by engaging the K0 clutch 12, the amount of working oil required to complete the clutch stroke of the K0 clutch 12 can be supplied before the D range is selected. Hence, when the D range is selected thereafter such that working oil is supplied to the C1 clutch 14 during the engagement control of the C1 clutch 14, the amount of required working oil can be reduced in comparison with a case where the K0 clutch 12 and the C1 clutch 14 are engaged in parallel. As a result, a driving apparatus for a hybrid vehicle that appropriately controls a plurality of clutches configured to vary a power transmission condition between a power source and a drive wheel can be provided.

Further, when a request to start the engine 10 is not issued after establishing the D range, the K0 clutch 12 is disengaged, and therefore a reduction in fuel efficiency can be suppressed. Moreover, when a request to start the engine 10 is issued after establishing the D range, the K0 clutch 12 is maintained in the engaged condition, and therefore the engine 10 can be started quickly.

Furthermore, engagement of the K0 clutch 12 is started even when the R range is selected, and therefore, when the D range is selected thereafter such that working oil is supplied to the C1 clutch 14 during the engagement control of the C1 clutch 14, the amount of required working oil can be reduced in comparison with a case where the K0 clutch 12 and the C1 clutch 14 are engaged in parallel.

Moreover, on condition that the R range is selected, engagement of the K0 clutch 12 is started after starting to engage the C2 clutch 16. In this embodiment in particular, the engagement control is executed on the K0 clutch 12 after the clutch stroke of the C2 clutch 16 is completed. Therefore, at the point where the engagement control is executed on the K0 clutch 12, the amount of working oil required to complete the clutch stroke of the C2 clutch 16 has been supplied. Hence, when working oil is supplied to the K0 clutch 12 during the engagement control of the K0 clutch 12, the required amount of working oil can be reduced in comparison with a case where the K0 clutch 12 and the C2 clutch 16 are engaged in parallel.

Further, when the R range is selected, the MG control is executed together with engagement of the K0 clutch 12. Therefore, torque variation can be suppressed, with the result that shocks and noise can be prevented from occurring in the vehicle 1.

Furthermore, when switching to the D range, the C1 clutch 14 can be engaged without a deficiency in the amount of working oil, and therefore deterioration of a startup response caused by slippage in the C1 clutch 14 and the K0 clutch 12 is suppressed. Moreover, the K0 clutch 12 is engaged in the N range before switching to the D range, and therefore the engine 10 can be operated quickly when a request to operate the engine 10 is issued after switching to the D range. Since an increase in the working oil supply amount can be suppressed, a required performance of the EOP is prevented from increasing, and as a result, a cost increase can be suppressed.

Modified examples will now be described. In this embodiment, a case in which the engagement control is executed on the K0 clutch 12 upon selection of the N range was described, but the engagement control may be executed on the K0 clutch 12 following the elapse of a predetermined time after the N range is selected, for example.

In this embodiment, a case in which the ECU 100 issues a request to operate the engine 10 when the required power, which is based on the operation amount of the accelerator pedal and the speed of the vehicle 1, exceeds the threshold and issues a request to stop the engine 10 when the required power falls below the threshold was described. However, issuance of the requests to operate and stop the engine 10 is not limited to these conditions in particular.

For example, the ECU 100 may issue a request to operate the engine 10 when a state of charge (SOC) of the battery 42 falls below a threshold, and may issue a request to stop the engine 10 when the SOC of the battery 42 exceeds the threshold.

Alternatively, the ECU 100 may, for example, issue a request to operate the engine 10 when a predetermined accessory such as an air-conditioning apparatus or a defroster is operated, and may issue a request to stop the engine 10 when the predetermined accessory is stopped.

Alternatively, the ECU 100 may issue a request to operate the engine 10 when, during cruise control, a speed difference between a current vehicle speed and a target vehicle speed exceeds a threshold, and may issue a request to stop the engine 10 when the speed difference falls below the threshold.

In this embodiment, a case in which the K0 clutch 12, the C1 clutch 14, and the C2 clutch 16 are all wet clutches was described, but at least one of the K0 clutch 12, the C1 clutch 14, and the C2 clutch 16 may be a dry clutch.

In this embodiment, the subjects of the oil pressure regulation performed by the hydraulic circuit 26 are not limited to the K0 clutch 12, the C1 clutch 14, and the C2 clutch 16, and may include, for example, engagement elements that are engaged to establish gear positions other than the first speed, an actuator that adjusts a belt clamping pressure of a belt type continuously variable transmission, and so on.

In this embodiment, a case in which the K0 clutch 12 is engaged in the N range and the R range was described, but as long as enough working oil to complete the clutch stroke is supplied to the K0 clutch 12 in the N range and the R range, the K0 clutch 12 does not necessarily have to be set in the engaged condition in the N range and the R range. For example, the K0 clutch 12 may be set in a half-engaged condition in the N range and the R range. Further, the K0 clutch 12 may be engaged in another shift range from which a switch to the D range is possible, such as the P range, in addition to the N range and the R range.

In this embodiment, a case in which the torque converter 24 is provided between the MG 22 and the automatic transmission 23 was described, but the torque converter 24 may be omitted such that the rotary shaft of the MG 22 and the input shaft of the automatic transmission 23 are connected directly.

In this embodiment, a case in which the automatic transmission 23 is a stepped automatic transmission having a planetary gear mechanism as the speed change unit was described, but the invention is not limited particularly thereto. For example, the automatic transmission 23 may be a continuously variable transmission (CVT) in which the speed ratio is modified continuously using a belt or the like. Alternatively, the automatic transmission 23 may be an automated manual transmission, for example.

In this embodiment, a case in which the K0 clutch serving as a first engagement element is engaged in response to a request to operate the internal combustion engine was described, but the invention is not limited particularly thereto. For example, the K0 clutch may be engaged when a shift from EV travel to HV travel is performed in response to an acceleration request or the like from the driver and so on, or in other words when any request to set the internal combustion engine and the motor in a power transmissible condition is issued. Note that the modified examples described above may be combined partially or wholly and implemented in these combinations.

The embodiment disclosed herein is in all respects exemplary, and is not to be considered limiting. The scope of the invention is defined by the claims rather than the above description, and is intended to include all modifications having equivalent meanings and within the scope of the claims.

What is claimed is:

1. A driving apparatus for a hybrid vehicle, the driving apparatus comprising:
an internal combustion engine;
an electric motor;
a transmission configured to transmit power from at least one of the internal combustion engine and the electric motor to a drive wheel of the hybrid vehicle;
a first engagement element configured to engage between the internal combustion engine and the electric motor to establish a first power transmission condition;
a second engagement element configured to engage between an input shaft and an output shaft of the transmission to establish a second power transmission condition, and the second engagement element being configured to disengage between the input shaft and the output shaft to establish a power cutoff condition;
an oil pressure source configured to supply working oil to the first engagement element and the second engagement element;
a selector configured to select any of a plurality of shift ranges, the plurality of shift ranges including a first range and a second range, the first range being established by setting the second engagement element in an engaged condition and the second range being established by setting the second engagement element in a disengaged condition; and
an electronic control unit configured to control the first engagement element to engage between the internal combustion engine and the electric motor when the second range is selected by the selector, wherein the electronic control unit is configured to control the first engagement element to disengage between the internal combustion engine and the electric motor when the first range is selected after establishing the second range and a request to operate the internal combustion engine has not been issued.

2. The driving apparatus according to claim 1, wherein the electronic control unit is configured to control the first engagement element to engage between the internal combustion engine and the electric motor on condition that the second range is selected by the selector.

3. The driving apparatus according to claim 1, wherein, the electronic control unit is configured to maintain the first engagement element in an engaged condition on condition that the second range is selected by the selector when the first engagement element is engaged.

4. The driving apparatus according to claim 1, wherein, the electronic control unit is configured to control the first engagement element to engage between the internal combustion engine and the electric motor on condition that the second range is selected by the selector when the first engagement element is not engaged.

5. The driving apparatus according to claim 1, wherein the electronic control unit is configured to maintain the first engagement element in an engaged condition when the first range is selected after establishing the second range and a request to operate the internal combustion engine has been issued.

6. The driving apparatus according to claim 1, further comprises
a third engagement element configured to engage between the input shaft and the output shaft of the transmission to establish a third power transmission condition, wherein
the plurality of shift ranges further include a third range, the third range being established by setting the third engagement element in an engaged condition, and
the electronic control unit is configured to start to control the first engagement element to engage between the internal combustion engine and the electric motor after starting to control the third engagement element to engage between the input shaft and the output shaft of the transmission on condition that the third range is selected by the selector.

7. The driving apparatus according to claim 6, wherein the electronic control unit is configured to control the first engagement element to engage between the internal combustion engine and the electric motor after engaging the third engagement element when the third range is selected by the selector.

8. The driving apparatus according to claim 6, wherein
the first range is a forward travel range, and
the third range is a reverse travel range.

9. A control method for a hybrid vehicle, the hybrid vehicle including:
a driving apparatus;
an internal combustion engine;
an electric motor;
a transmission configured to transmit power from at least one of the internal combustion engine and the electric motor to a drive wheel of the hybrid vehicle;
a first engagement element configured to engage between the internal combustion engine and the electric motor to establish a first power transmission condition;
a second engagement element configured to engage between an input shaft and an output shaft of the transmission to establish a second power transmission condition, and the second engagement element being configured to disengage between the input shaft and the output shaft to establish a power cutoff condition;

an oil pressure source configured to supply working oil to the first engagement element and the second engagement element; and a selector configured to select any of a plurality of shift ranges, the plurality of shift ranges including a first range and a second range, the first range being established by setting the second engagement element in an engaged condition and the second range being established by setting the second engagement element in a disengaged condition;

the control method comprising engaging the first engagement element when the second range is selected by the selector, and controlling the first engagement element to disengage between the internal combustion engine and the electric motor when the first range is selected after establishing the second range and a request to operate the internal combustion engine has not been issued.

* * * * *